United States Patent
Rajala

(10) Patent No.: US 9,875,638 B2
(45) Date of Patent: Jan. 23, 2018

(54) METHOD AND SYSTEM FOR GENERATING GEOFENCES FOR MANAGING OFFENDER MOVEMENT

(71) Applicant: Numerex Corp., Atlanta, GA (US)

(72) Inventor: Yoganand Rajala, Alpharetta, GA (US)

(73) Assignee: NUMEREX CORP., Atlanta, GA (US)

( * ) Notice: Subject to any disclaimer, the term of this patent is extended or adjusted under 35 U.S.C. 154(b) by 0 days.

(21) Appl. No.: 14/525,808

(22) Filed: Oct. 28, 2014

(65) Prior Publication Data

US 2016/0117910 A1 Apr. 28, 2016

(51) Int. Cl.
  *G08B 21/22* (2006.01)
  *H04W 4/02* (2009.01)

(52) U.S. Cl.
  CPC ............ *G08B 21/22* (2013.01); *H04W 4/021* (2013.01)

(58) Field of Classification Search
  CPC ........... G08B 21/0233; G08B 21/0423; G08B 21/0469; G08B 21/22; G08B 21/0453; G07C 9/00111
  See application file for complete search history.

(56) References Cited

U.S. PATENT DOCUMENTS

| | | | |
|---|---|---|---|
| 5,568,119 A * | 10/1996 | Schipper | G01S 19/48 340/10.41 |
| 5,731,757 A * | 3/1998 | Layson, Jr. | G08B 21/028 340/5.61 |
| 5,870,029 A * | 2/1999 | Otto | G08B 21/22 340/573.1 |
| 5,892,454 A * | 4/1999 | Schipper | G01S 19/48 340/10.41 |
| 6,014,080 A * | 1/2000 | Layson, Jr. | G08B 21/0211 340/539.1 |
| 6,054,928 A * | 4/2000 | Lemelson | G08B 21/0233 340/539.1 |
| 6,093,869 A * | 7/2000 | Roe | A61F 13/42 604/358 |
| 6,100,806 A * | 8/2000 | Gaukel | B60R 25/1004 340/10.41 |
| 6,149,636 A * | 11/2000 | Roe | A61F 13/42 604/358 |
| 6,405,213 B1 * | 6/2002 | Layson | G06Q 10/10 340/539.1 |
| 6,407,308 B1 * | 6/2002 | Roe | A61B 5/04884 604/361 |
| 6,703,936 B2 * | 3/2004 | Hill | G07C 9/00111 340/573.1 |
| 7,518,500 B2 * | 4/2009 | Aninye | G07C 9/00111 340/506 |

(Continued)

*Primary Examiner* — Hai Phan
*Assistant Examiner* — Son M Tang
(74) *Attorney, Agent, or Firm* — King & Spalding LLP

(57) ABSTRACT

A computer-based system can generate geofences that are useful for managing offenders who are wearing devices that track their locations, such as offender monitors. In one mode, the computer-based system can track an offender's movement patterns and associated times and utilize the resulting data to generate proposed geofences. In another mode, the computer-based system can propose geofences based on offender category. Establishment categories can be determined based on offender category, and establishments can be identified based on establishment category. Proposed geofences can be created for the identified establishments.

17 Claims, 5 Drawing Sheets

(56) References Cited

U.S. PATENT DOCUMENTS

| | | | | |
|---|---|---|---|---|
| 8,149,113 B2* | 4/2012 | Diem | G06Q 10/00 | 340/5.2 |
| 8,493,219 B2* | 7/2013 | Buck | G08B 21/0261 | 340/539.13 |
| 8,514,070 B2* | 8/2013 | Roper | G08B 21/0286 | 340/539.13 |
| 8,560,557 B1* | 10/2013 | Poe | G06Q 10/06 | 707/754 |
| 8,797,210 B2* | 8/2014 | Derrick | G07C 1/20 | 342/357.54 |
| 8,831,627 B2* | 9/2014 | Aninye | B60R 25/1004 | 340/539.11 |
| 8,862,152 B1* | 10/2014 | Buchholz | G08B 21/02 | 455/456.1 |
| 9,749,780 B2* | 8/2017 | Huang | H04W 4/02 | |
| 9,782,302 B2* | 10/2017 | Johnson | A61F 13/42 | |
| 2001/0048364 A1* | 12/2001 | Kalthoff | G01S 5/0009 | 340/573.1 |
| 2002/0183924 A1* | 12/2002 | Yokota | G01C 21/36 | 701/410 |
| 2005/0128074 A1* | 6/2005 | Culpepper | G08B 21/0269 | 340/539.1 |
| 2006/0109110 A1* | 5/2006 | Hill | G07C 9/00111 | 340/539.13 |
| 2006/0129691 A1* | 6/2006 | Coffee | H04L 67/04 | 709/230 |
| 2007/0159343 A1* | 7/2007 | Crucilla | G07C 9/00111 | 340/573.4 |
| 2007/0276270 A1* | 11/2007 | Tran | A61B 5/4076 | 600/508 |
| 2009/0002188 A1* | 1/2009 | Greenberg | A01K 15/023 | 340/686.1 |
| 2009/0043501 A1* | 2/2009 | Lohi | G01S 5/0027 | 701/469 |
| 2010/0066545 A1* | 3/2010 | Ghazarian | G08B 21/0258 | 340/573.4 |
| 2010/0114485 A1* | 5/2010 | Bhogal | G01C 21/3446 | 701/414 |
| 2011/0314495 A1* | 12/2011 | Zenor | G06Q 30/02 | 725/34 |
| 2012/0255875 A1* | 10/2012 | Vicente | A61B 5/002 | 205/782 |
| 2012/0302204 A1* | 11/2012 | Gupta | H04M 15/44 | 455/406 |
| 2013/0090090 A1* | 4/2013 | Rivere | G06Q 10/06 | 455/411 |
| 2013/0225196 A1* | 8/2013 | James | H04W 4/028 | 455/456.1 |
| 2014/0155094 A1* | 6/2014 | Zises | H04W 4/206 | 455/456.3 |
| 2014/0157312 A1* | 6/2014 | Williams | H04N 21/4126 | 725/39 |
| 2014/0180572 A1* | 6/2014 | Acker, Jr. | G01C 21/00 | 701/410 |
| 2014/0279167 A1* | 9/2014 | Miller | G06Q 30/0611 | 705/26.4 |
| 2015/0012963 A1* | 1/2015 | Gupta | H04L 63/104 | 726/1 |
| 2015/0042489 A1* | 2/2015 | LaVon | A61F 13/42 | 340/870.11 |
| 2015/0048941 A1* | 2/2015 | Wagner | G06Q 10/06 | 340/539.13 |
| 2015/0154614 A1* | 6/2015 | Sullivan | G06Q 30/0201 | 705/7.29 |
| 2015/0271639 A1* | 9/2015 | Ziskind | H04W 4/021 | 455/456.1 |

* cited by examiner

METHOD AND SYSTEM FOR GENERATING GEOFENCES FOR MANAGING OFFENDER MOVEMENT

TECHNICAL FIELD

The present technology relates generally to offender monitors for tracking locations of offenders, and more particularly to setting up geofences for managing movements of offenders who are wearing offender monitors.

BACKGROUND

Geofences offer a useful tool for managing offenders who are under location surveillance utilizing an offender monitor as a tracking device. When an offender crosses or nears a geofence, an authority, such as a parole officer, can receive a notification. For example, a geofence can provide a boundary around a residence or workplace of a victim of the offender. With conventional technology, generating such geofences can be tedious and laborious.

Accordingly, there are needs in the art for tools to assist with generation of geofences. For example, need exists for a computer-based system to generate geofences automatically or semi-automatically, which a user may adopt, reject, or customize. A technology addressing such a need, or some related deficiency in the art, would result in benefits that may include improved management of offenders, for example.

SUMMARY

A computer-based system can generate geofences for managing movements of offenders who are wearing GPS-based devices that track their locations, such as offender monitors. In one alternative for generating geofences, the system can track an offender's movement patterns and associated times and utilize the resulting data to generate proposed geofences presented on a graphical user interface (GUI). In another alternative, the system can propose geofences based on offender category. The system can utilize offender category to identify establishments that may be off limits, restricted according to schedule or time, or otherwise sensitive and thus worthy of having an associated geofence.

The foregoing discussion of producing geofences is for illustrative purposes only. Various aspects of the present technology may be more clearly understood and appreciated from a review of the following text and by reference to the associated drawings and the claims that follow. Other aspects, systems, methods, features, advantages, and objects of the present technology will become apparent to one with skill in the art upon examination of the following drawings and text. It is intended that all such aspects, systems, methods, features, advantages, and objects are to be included within this description and covered by this application and by the appended claims of the application.

Figure 1:
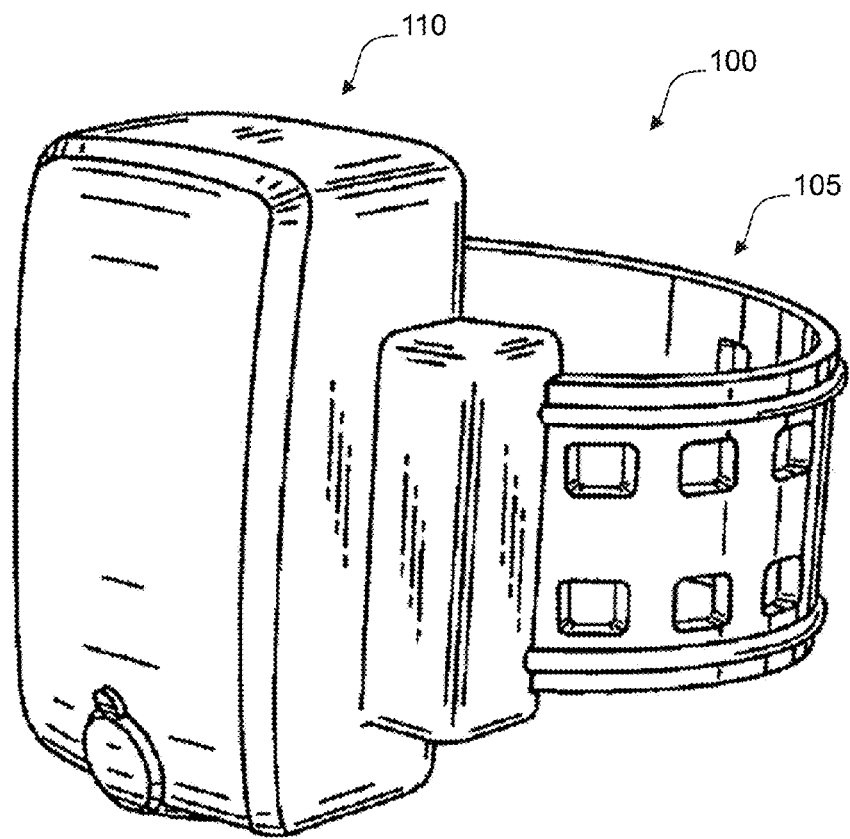
FIG. 1 is an illustration of an offender monitor in accordance with some example embodiments of the present technology.

Many aspects of the technology can be better understood with reference to the above drawings. The elements and features shown in the drawings are not necessarily to scale, emphasis being placed upon clearly illustrating the principles of exemplary embodiments of the present technology. Moreover, certain dimensions may be exaggerated to help visually convey such principles.

DESCRIPTION OF EXAMPLE EMBODIMENTS

A computer-based system and process can generate geofences for managing offenders who are under location surveillance utilizing offender monitors. The offender monitors can incorporate location detectors, such as global positioning system (GPS) technology, for location tracking and wireless communication technology for location reporting. A geofence can cause an action, for example providing a notification, when an offender crosses a geofence boundary.

For example, a parolee's movements may be confined to a designated area that has an associated geofence. In this case, the geofence establishes an included or allowed area. If the parolee leaves the area, the parolee's parole officer can receive a notification that is automatically generated when the parolee crosses the geofence.

In addition to an inclusionary function, a geofence may establish an excluded area. For example, an offender with a record of child abuse may be prohibited from entering an area that surrounds a school and that is defined by a geofence. The act of the offender crossing the geofence to enter the area can raise an alarm or other notification.

Some example embodiments of the present technology will be discussed in further detail below with reference to the figures. However, the present technology can be embodied in many different forms and should not be construed as limited to the embodiments set forth herein. Rather, these embodiments are provided so that this disclosure will be thorough and complete, and will fully convey the scope of the technology to those having ordinary skill in the art. Furthermore, all "examples," "embodiments," "example embodiments," or "exemplary embodiments" given herein are intended to be non-limiting and among others supported by representations of the present technology.

Some of the embodiments may comprise or involve processes that will be discussed below. Certain steps in such processes may naturally need to precede others to achieve intended functionality or results. However, the technology is not limited to the order of the steps described to the extent that reordering or re-sequencing does not render the processes useless or nonsensical. Thus, it is recognized that some steps may be performed before or after other steps or in parallel with other steps without departing from the scope and spirit of this disclosure.

Turning now to FIG. 1, this figure illustrates an example offender monitor 100 according to some embodiments of the present technology. The illustrated offender monitor 100 provides a representative, non-limiting example, of a tracking device.

The illustrated offender monitor 100 comprises a strap 105 that extends around an appendage of an offender, for example the offender's leg or arm, who is being monitored. The strap 105 is attached to a housing 110 that encloses electrically powered elements as discussed below. The offender may be a criminal on parole or a person under a government order for monitoring, for example. In example embodiments, the illustrated offender monitor 100 can be characterized as a tracking device for monitoring the movement of an individual.

In some example embodiments, the housing 110 can enclose various components such as one or more batteries, electronic circuitry (e.g., a transceiver, GPS locating circuitry, antenna, etc.), optical devices (e.g., a light source, a light receiver, etc.) and optical connectors. Padding can optionally be provided on the back of the housing 110 to facilitate wearing the offender monitor 100 comfortably around a leg or an arm of an individual, for example. Alternatively, the padding can be omitted. The individual can be, for example, an offender who is subject to a restraining order or house arrest from a court or other authority. One end of the strap 105 attaches to the housing 110. In installation, the other end of the strap 105 is wrapped around the individual's leg or arm and attached to the housing 110, for example using pins or other fasteners.

U.S. Pat. No. 8,115,621, issued Feb. 14, 2012 in the name of Yoganand Rajala and Steve Aninye and entitled "Device for Tracking the Movement of Individuals or Objects" discloses some example embodiments of an offender monitor 100 and is hereby incorporated herein by reference.

Figure 2:
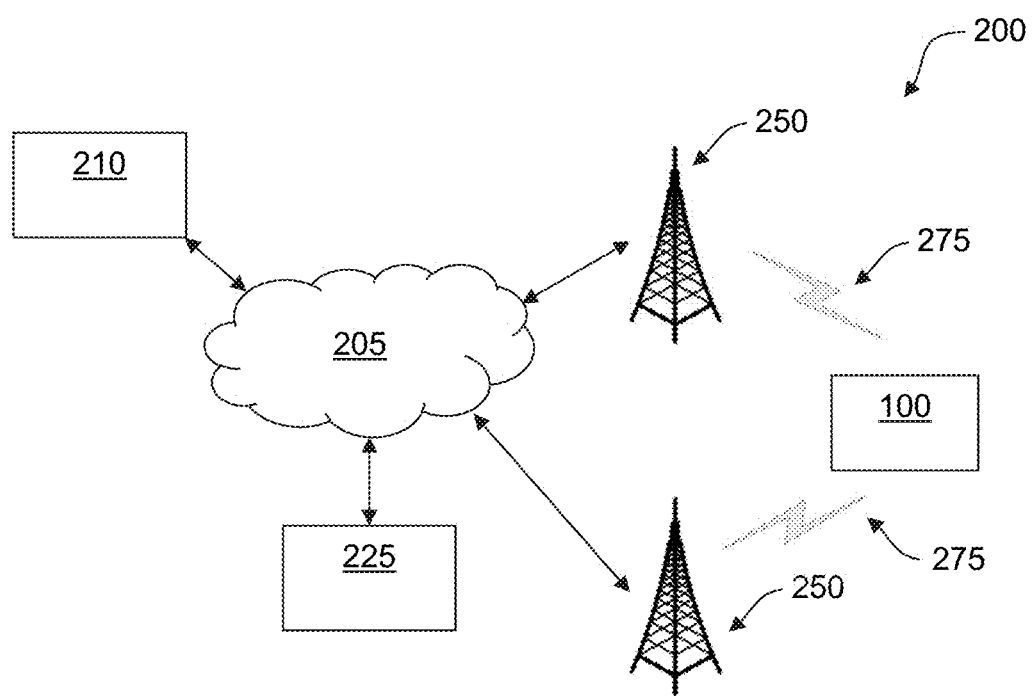
FIG. 2 is an illustration of an operating environment for an offender monitor in accordance with some example embodiments of the present technology.

Turning now to FIG. 2, this figure illustrates an example operating environment for the offender monitor 100 according to some embodiments of the present technology. In the illustrated embodiment, the operating environment comprises a cellular system 200. As illustrated, the offender monitor 100 is located near two cell towers 250 and may communicate with either via respective communication channels 275. The cell towers 250 communicate with a server 210 over a network 205. In some example embodiments, the network 205 comprises the Internet. A user station 225 is also connected to the network 205. The user station 225 can communicate with the offender monitor 100 through the server, or alternatively directly.

The server 210 provides location services for the offender monitor 100 as well as for other monitors (not illustrated) that may be attached to other people or objects. In an example embodiment, the server 210 typically comprises an Internet connection, a processor, and memory. In some example embodiments, the server 210 comprises a GUI and can generate geofences. In some example embodiments, the server 210 can comprise a group or cluster of servers acting as a single logical entity.

The user station 225 provides an interface through which a user, for example an officer such as a parole officer or official, can interact with the offender monitor 100 and the server 210. As will be discussed in further detail below, the user station 225 can be configured to generate geofences and can comprise a GUI for presentation of geofences and for user interaction. In some embodiments, the user station 225 can act like a client for the server 210, with created geofences stored and enforced on the server 210.

Figure 3:
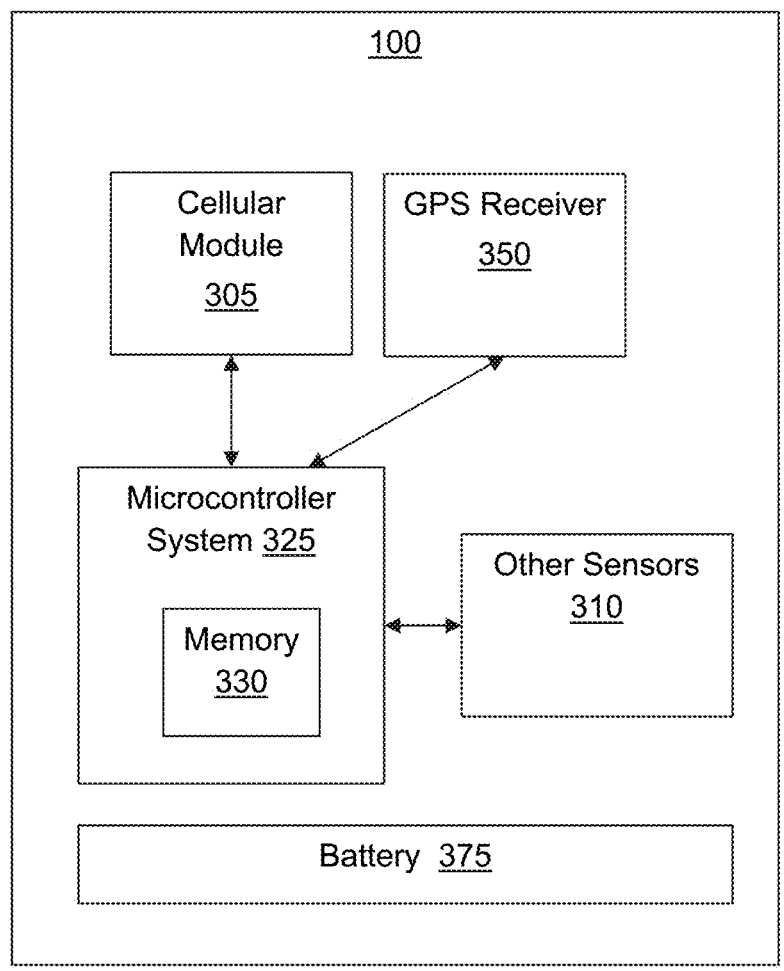
FIG. 3 is a functional block diagram of an offender monitor in accordance with some example embodiments of the present technology.

Turning now to FIG. 3, this figure illustrates a functional block diagram for the example offender monitor 100 according to some embodiments of the present technology. In the illustrated embodiment, the offender monitor 100 comprises a cellular module 305, a GPS receiver 350, a microcontroller system 325, and other sensors 310, all of which are powered by an on-board battery 375. The cellular module 305 comprises an example embodiment of a radio. In various embodiments, the cellular module 305 can comprise CDMA, GSM, UMTS, HSPA, or LTE technology. In some embodiments, the GPS receiver 350 is embedded in the cellular module 305. The other sensors 310 may include tamper detectors, orientation sensors, switches, microphones, gyroscopes, accelerometers, etc.

The GPS receiver 350 comprises an example embodiment of a location detector. In some embodiments, a location detector within the offender monitor 100 employs cell-tower-based triangulation, such as advanced forward link trilateration (AFLT), or employs a signal-strength-based location approach, such as received signal strength indicator (RSSI) based on tower or Wifi signals. The offender monitor 100 can utilize such technologies as embodiments of a location detector to augment or support, or as a substitution for, satellite-based location tracking. Further, GPS tracking can utilize assisted GPS (A-GPS) to improve location acquisition speed.

In some example embodiments, the cellular module 305 and the GPS receiver 350 are integrated into a single modem module or chip or chip set. In operation, the cellular module 305 maintains a connection to the one or more cell towers 250 over one or more wireless channels 275 through a wireless network as illustrated in FIG. 2. In an example embodiment, the cellular module 305 continuously attempts to keep a cellular connection available to the tower 250. In such an embodiment, the server 210 can control the operation of the offender monitor 100 by sending commands or other data to the monitor 100 at any time.

In an example embodiment, the microcontroller system 325 comprises a low-power microcontroller and associated memory 330. The microcontroller system 325 can comprise a microprocessor or other appropriate processor, for example. Example embodiments of the memory 330 can comprise volatile and nonvolatile memory, such as random access memory (RAM) and flash memory for example. The memory 330 can comprise persistent memory that stores program code. Accordingly, the memory 330 can comprise firmware for executing management and control functions.

When triggered by the microcontroller system 325, a GPS acquisition occurs on the GPS receiver 350. The microcontroller system 235 can further control the cellular module 305 in connection with transmitting acquired GPS data, notifications, alarms, and other appropriate data and with receiving commands and other data.

Figure 4:
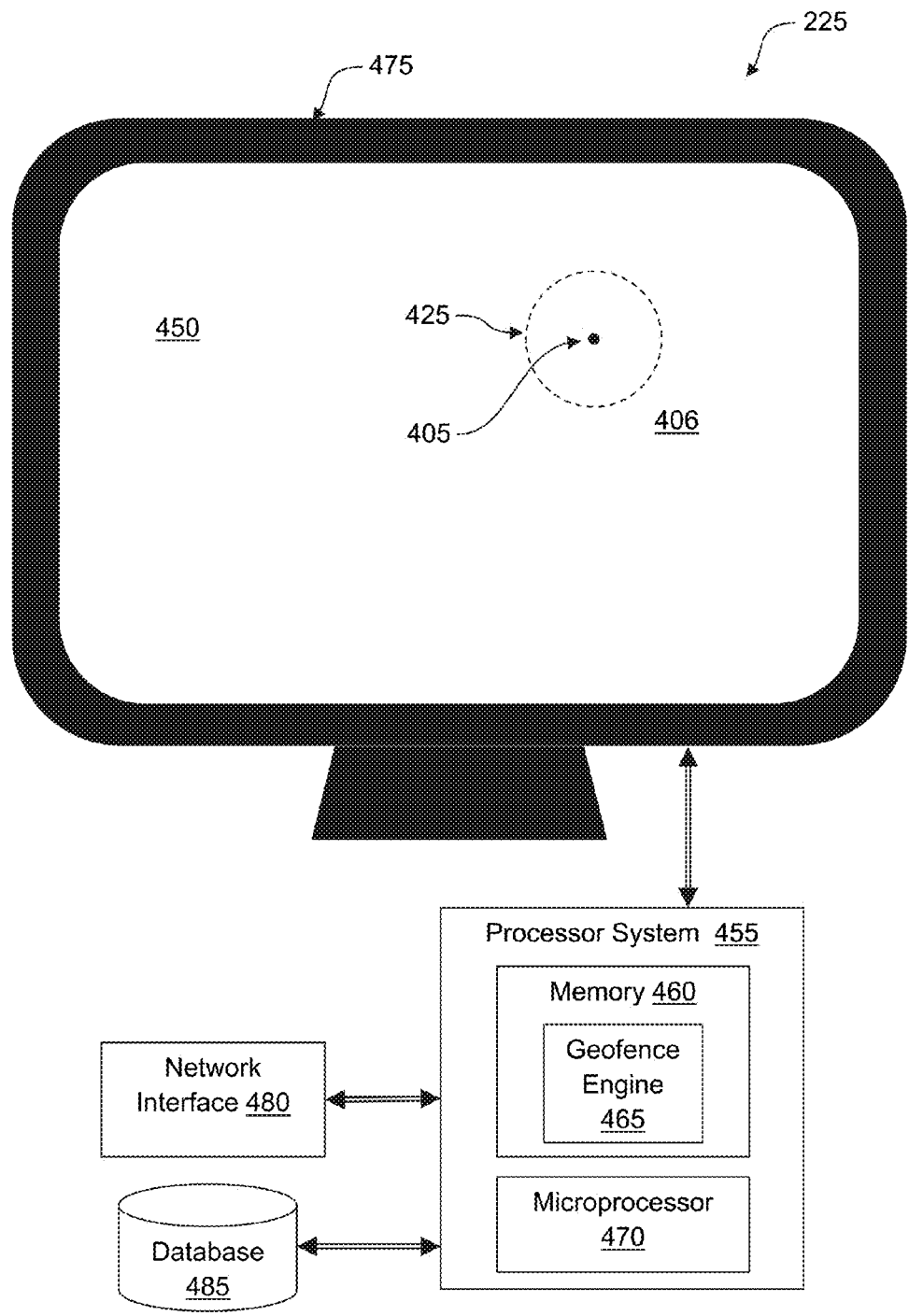
FIG. 4 is an illustration of a user station in accordance with some example embodiments of the present technology.

Turning now to FIG. 4, this figure illustrates a user station 225 according to some embodiments of the present technology. The user station 225 provides an interface for a user, for example an officer, to review GPS data collected by the offender monitor 100, to create geofences, to set up offender management parameters, and to perform other tasks associated with offender management.

In some embodiments, the user station 225 is dedicated for offender management. In some embodiments, the user station 225 is implemented in whole or in part on a personal computer, laptop, or other general purpose computing system. For example, the user station 225 may be implemented as a password-protected web portal that an officer can access from any most any computer that provides Internet connectivity. Thus, in the evening or over the weekend, the officer might use his or her home computer as the user station 225, and then during workdays, use another computer located at the officer's place of employment.

In the illustrated embodiment, the user station 225 comprises a monitor 475 and associated GUI 450, a processor system 455, a network interface 480, and a database 485. In various embodiments, the user station 225 can comprise a client machine and can comprise a general computer, a laptop, a smart phone or handheld, a tablet, a workstation, personal computer, or other appropriate device. In some embodiments, the user station 225 comprises a web application that is based on geofences stored and enforced on the server 210.

In an example embodiment, the processor system 455 comprises a microprocessor 470 or other appropriate processor and associated memory 460. Example embodiments of the memory 460 can comprise volatile and nonvolatile memory, such as random access memory (RAM) and flash memory. For example, the memory 460 can comprise persistent memory that stores program code, including a geofence engine 465. An example embodiment of the geofence engine 465 comprises computer executable instructions for generating geofences, such as code for process 500 that is illustrated in flowchart form in FIG. 5 and discussed below. In some embodiments, the geofence engine 465 is executed in whole or in part via a web portal.

The network interface 480 provides connectivity to the network 205 or other appropriate network, so that the user station 225 can exchange communications with various other devices and access remote network resources. In some embodiments, the network interface 480 provides remote access to the geofence engine 465, so that the geofence engine 465 can be implemented as a remote resource.

The database 485 stores information supporting geofence generation, such as map data, establishment identifications and locations, correlations between offender categories and establishment categories, lists of establishments correlated to establishment categories, and other appropriate information. In some embodiments, the database 485 is collocated with the other elements of the user station 225. In some embodiments, the database 485 is remote and is accessed over the Internet via the network interface 480. For example, the database 485 may be maintained at the server 210 or distributed across multiple vendor facilities.

The monitor 475 comprises the GUI 450 through which a user can create and customize geofences. As illustrated, the GUI 450 comprises a map 406. An establishment 405 is illustrated on the map 406 with a graphical representative of a geofence 425 circumscribing or defining a perimeter around the establishment 405. In some embodiments, the user can use a pointer to modify geofence 425, for example using a mouse to stretch the geofence 425 to a larger size that encompasses more geographical area or to compress to a smaller size as appropriate.

Figure 5:
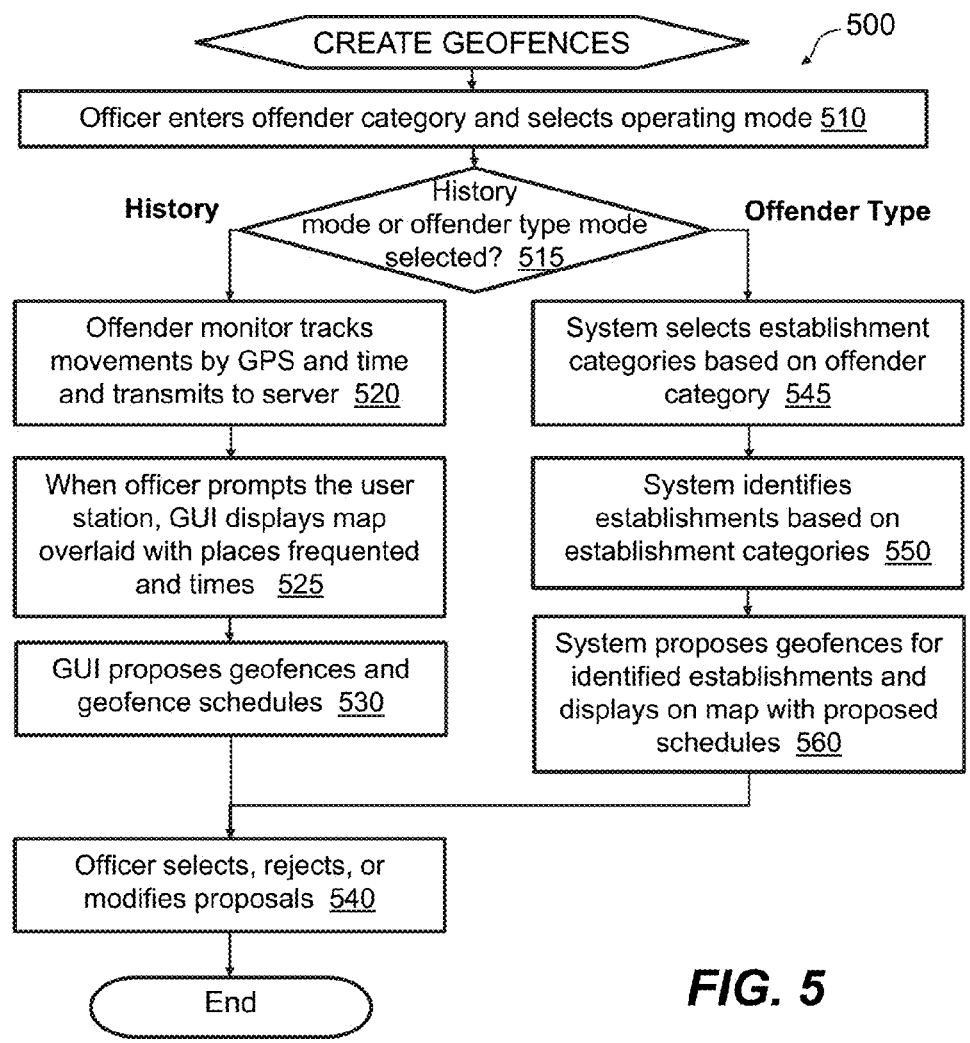
FIG. 5 is a flowchart of a process for generating geofences in accordance with some example embodiments of the present technology.

An example process 500 for creating geofences will now be described in further detail with reference to FIG. 5. Example reference will be made to the preceding figures, without limitation. In some example embodiments, instructions for execution of the relevant parts of the process 500 that FIG. 5 illustrates in flowchart form can be stored in the memory 460 and executed by the processor system 455 of the user station 225, for example. As discussed above, process 500 can comprise the geofence engine 465 maintained on the memory 460.

At block 510 of process 500, the officer enters an offender category and selects an operating mode for generating geofences 425. A representative offender category may describe a type of offense committed by the offender. The offender category may specify that the person wearing the offender monitor 100 committed child abuse, sexual abuse, domestic violence, a narcotic violation, or driving under the influence (DUI), to mention a few representative examples without limitation.

The mode selection specifies whether the officer would prefer to utilize a historical approach that learns based on tracking or a type-of-offender approach that can utilize maps and databases for generating geofences for the offender.

Decision block 515 branches the execution of process 500 according to whether the officer selected the historical mode or the type-of-offender mode. If the historical mode is selected, blocks 520, 525, 530, and 540 execute. If the type-of-offender mode is selected, blocks 545, 550, 560, and 540 execute.

At block 520, the offender monitor 100 tracks movements of the offender by location and time and transmits the resulting data to the server 520. The tracking can continue for a period of time set by the officer, for example at least one or more weeks. In some embodiments, the offender monitor 100 is placed in a learning mode. In such a learning mode, the offender monitor 100 can provide supplemental data, functionality, or timestamps to facilitate learning. For example, the offender monitor 100 can acquire and report positional data more frequently than in the offender monitor's normal operational. Thus, the offender monitor 100 can have a learning mode for generating geofences 425 utilizing historical patterns of movement and a normal operational mode for routine offender monitoring.

In some embodiments, upon logging in, the officer is presented with fresh tracking data, proposed geofences or geofence modifications, or information relevant to modifying geofences. Accordingly, the officer can utilize a continuous process, whereby the offender monitor 100 continuously tracks the offender. For example, the server 210 can continuously identify the offender's frequent stops where pre-existing geofences are not in place. Thus, when the officer logs in, he or she can be prompted with details of the offender's frequent stops that are not at previously created geofences. The officer can quickly preview the map, refine geofence sizes as deemed appropriate, and approve or mark any particular location as not of interest by ignoring it.

At block 525, the officer prompts the user station to display the data acquired from the tracking of block 520. The GUI 450 responds by displaying the map 406 overlaid with locations frequented by the offender and times that the offender was at the indicated locations. The officer may review the data and select for the tracking of block 520 to continue or to restart, for example.

At block 530, the processor system 455 generates geofences 425 and an associated schedule based on the acquired data. In some embodiments, the officer can create the schedule based on a curfew schedule. For example, the processor system 455 can suggest a tentative schedule that the officer can adjust according to a curfew schedule. In an example embodiment, the processor system 455 utilizes the tracked locations and associated times of the training period as an acceptable baseline and generates geofences 425 for raising notifications when the offender deviates from the pattern.

For example, the processor system 455 may note a consistent geographical location of the offender during every night and another location for the offender from Monday through Friday between 9:00 am and 5:00 pm. Based on this schedule, the processing system 455 can determine that the respective locations are the offender's home and the offender's place of employment. The processing system 455 can thus deem these locations as acceptable and generate proposed inclusionary geofences 425 according to the schedule.

At block 540, the officer reviews the proposed geofences 425 presented on the GUI 450. The officer may use a pointer to expand or contract the proposed geofences 425 and further may accept or reject the geofences 425.

If the type-of-offender mode rather than the historical mode is selected, then block 545 executes from block 515.

At block 545, the processor system 455 references the database 485 to identify establishment categories associated with the offender category designated at block 510. For example, if the offender category is child abuse, then the database 485 can identify schools as an establishment category. As another example, for an offender category of DUI, the database 485 can identify package stores and bars as establishment categories.

At block 550, the processor system 455 references the database 485 to identify specific establishments and geographical locations of those establishments according to the establishment categories. For example, the processor system 455 can query the database 485 to list all schools within a designated geographical area, or all establishments that have a liquor license by searching public records or map vendor data. The designated geographical area can be officer selected (e.g. city, state, or zip code) or based on cities in which the offender has traveled based on historical data. In some embodiments, the data resulting from blocks 545 and 550 is obtained from a single database query. For example, blocks 545 and 550 may be combined.

At block 560, the processor system 455 proposes geofences 425 for the identified establishments 405 and displays the proposal in graphic form on the GUI 450. The processor system 455 can utilize a default geofence size or can utilize a radial dimension input by the officer, for example.

As discussed above, the officer selects, rejects, or modifies the proposed geofences at block 540. In some embodiments, the user station 225 produces a physical record of the geofences 425 as adopted. Such a physical record may comprise a paper-based report, for example.

In some embodiments, as an alternative to creating, approving, and storing individual geofences, the officer can make a broad approval of proposed geofences, for example "all schools at a designated city/zip code." In such a case, the resulting data can be stored to indicate that geofences are based on a city/zip code level, for example.

Technology for creating geofences has been described. From the description, it will be appreciated that embodiments of the present technology overcome limitations of the prior art. Those skilled in the art will appreciate that the present technology is not limited to any specifically discussed application or implementation and that the embodiments described herein are illustrative and not restrictive. From the description of the exemplary embodiments, equivalents of the elements shown therein will suggest themselves to those skilled in the art, and ways of constructing other embodiments of the present technology will appear to practitioners of the art.

What is claimed is:

1. A system comprising:
a network interface configured to receive location data transmitted wirelessly by an offender monitor for an offender;
memory;
a processor that is operably coupled to the network interface, to the memory, and to a graphical user interface (GUI); and
processor executable instructions stored in the memory for performing the steps of:

presenting on one or more pages of the GUI an option to select from at least a first historical mode and a second category mode for producing geofences for the offender monitor,
wherein the first historical mode generates a first set of modifiable geofences based on locations and corresponding location times associated with a movement of the offender and obtained from the offender monitor and the second category mode generates a second set of modifiable geofences based on a category of the offender and establishment categories associated with the category of the offender,
wherein the establishment categories identify locations of one or more points of interest;
responsive to determining a selection of the first historical mode,
tracking the locations and the corresponding location times of the offender monitor in a learning mode in which the offender monitor acquires and reports positional data more frequently than when in a normal mode of operation;
generating the first set of modifiable geofences for presentation on the remote GUI based on the tracked locations and the corresponding location times obtained during the learning mode; and
causing the offender monitor to change from the learning mode to the normal operational mode in which the offender monitor acquires and reports positional data.

2. The system of claim 1, wherein the processor executable instructions stored in the memory are further for performing the step of
producing a map overlaid with the tracked locations.

3. The system of claim 1, wherein the processor executable instructions stored in the memory are further for performing the step of
producing a map overlaid with the first set of modifiable geofences.

4. The system of claim 1, wherein the processor executable instructions stored in the memory are further for performing the step of
offering an option to accept or reject at least one of the first set of modifiable geofences, wherein at least one of the first set of modifiable geofences includes an allowed area geofence and an excluded area geofence.

5. The system of claim 1, wherein the processor executable instructions stored in the memory are further for performing the step of
offering an option to modify at least a size and a shape of at least one of the first set of modifiable geofences.

6. A system comprising:
a network interface configured to receive location data transmitted wirelessly by an offender monitor for an offender;
memory;
a processor that is operably coupled to the network interface, to the memory, and to a remote graphical user interface (GUI); and
processor executable instructions stored in the memory for performing the steps of:
presenting on one or more pages of the GUI an option to select from at least a first historical mode and a second category mode for producing geofences for the offender monitor,
wherein the first historical mode generates a first set of modifiable geofences based on locations and corresponding location times associated with a movement of the offender that is tracked using the offender monitor and the second category mode generates a second set of modifiable geofences based on a category of the offender's offense;

responsive to determining a selection of the second category mode, receiving identification of the category of the offender's offense;

identifying establishments based on the category of the offender's offense by querying a database; and generating the second set of modifiable geofences for presentation on the remote GUI based on the identified establishments.

7. The system of claim 6, wherein the step of identifying establishments comprises the steps of:

determining establishment categories based on the category of the offender's offense; and identifying the establishments based on the establishment categories, and wherein the database comprises an internal database or a vendor database.

8. The system of claim 6, wherein the processor executable instructions stored in the memory are further for performing the step of producing a map overlaid with the second set of modifiable geofences for presentation on the remote GUI.

9. The system of claim 6, wherein the processor executable instructions stored in the memory are further for performing the step of offering an option to accept one of the second set of modifiable geofences.

10. The system of claim 9, wherein the processor executable instructions stored in the memory are further for performing the step of offering an option to modify at least a size and a shape of at least one of the second set of modifiable geofences.

11. A system comprising:

a network interface that provides Internet connectivity for communicating with an offender monitor that comprises an operational mode for routine monitoring operation and a learning mode and that acquires and reports positional data more frequently in the learning mode than in the operational mode;

a graphical user interface (GUI);

a processor that comprises memory and that is operably coupled to the Internet interface and to the GUI; and processor executable instructions stored in the memory for performing the steps of:

presenting on one or more pages of the GUI one or more options to select from at least a first historical mode and a second category mode for producing geofences for the offender monitor, wherein the first historical mode generates a first set of modifiable geofences based on locations and corresponding location times associated with a movement of the offender and obtained from the offender monitor and the second category mode generates a second set of modifiable geofences based on an offender category and establishment categories associated with the offender category, wherein the establishment categories identify locations of one or more points of interest;

in response to selection of the first historical mode, producing the first set of modifiable geofences by utilizing the offender monitor in the learning mode; and in response to selection of the second category mode, producing the second set of modifiable geofences by utilizing a database that relates offender categories to establishment categories.

12. The system of claim 11, wherein utilizing the offender monitor in the learning mode comprises presenting on the GUI a map that presents movement history of the offender monitor and a graphical representation of the first set of modifiable geofences.

13. The system of claim 12, wherein the graphical representation of the produced first set of modifiable geofences comprises a graphic that can be enlarged or reduced to change one of the produced first set of modifiable geofences.

14. The system of claim 11, wherein producing the geofences comprises presenting on the GUI a proposed form of the first set of modifiable geofences for review.

15. The system of claim 11, wherein producing the second set of modifiable geofences by utilizing the database that relates offender categories to establishment categories comprises:

receiving an offender category for an offender associated with the offender monitor;

relating at least one establishment category to the offender category; and identifying establishments according to the at least one establishment category.

16. The system of claim 15, wherein producing the second set of modifiable geofences by utilizing the database that relates offender categories to establishments further comprises:

displaying on the GUI a map that presents the identified establishments; and presenting on the map graphical representations of the second set of modifiable geofences, each graphical representation associated with at least one of the identified establishments.

17. The system of claim 16, wherein the graphical representations are changeable to produce corresponding modifications of the second set of modifiable geofences.

* * * * *